United States Patent [19]

Shibata et al.

[11] E Patent Number: Re. 33,517

[45] Reissued Date of Patent: Jan. 8, 1991

[54] THERMOSENSITIVE RECORDING LABEL

[75] Inventors: Tomoo Shibata, Irvine; Wissam J. Jurdi, Tustin, both of Calif.

[73] Assignee: Ricoh Electronics, Inc., Santa Ana, Calif.

[21] Appl. No.: 169,846

[22] Filed: Mar. 18, 1988

Related U.S. Patent Documents

Reissue of:

[64] Patent No.: 4,577,204
Issued: Mar. 18, 1986
Appl. No.: 614,287
Filed: May 25, 1984

[51] Int. Cl.[5] ..... B41M 5/18

[52] U.S. Cl. ..... 503/200; 427/150; 428/40; 428/354; 428/355; 428/913; 428/914; 503/226

[58] Field of Search ..... 427/150, 151, 152; 428/40, 201-204, 206, 207, 352, 354, 355, 913, 914; 503/200, 201, 204, 226

[56] References Cited

U.S. PATENT DOCUMENTS

| | | | |
|---|---|---|---|
| 4,370,370 | 1/1983 | Iwata et al. | 427/150 |
| 4,388,362 | 6/1983 | Iwata et al. | 427/150 |
| 4,424,245 | 1/1984 | Maruta et al. | 428/339 |

*Primary Examiner*—Bruce H. Hess
*Attorney, Agent, or Firm*—Cooper & Dunham

[57] ABSTRACT

A thermosensitive recording label includes a substrate, a thermosensitive color-forming layer disposed on one side of the substrate, a protective layer disposed on the thermosensitive color-forming layer, a pressure-sensitive hot melt adhesive layer disposed on another side of the substrate and a releasable backing sheet disposed on the pressure-sensitive adhesive layer. The use of a hot melt adhesive layer enables the thermosensitive label to be placed on plastic films without migration of plasticizers in the film from migrating into the color-sensitive layer. The hot melt adhesive not only prevents such plasticizers migration, but enables the labels to be placed on beef products without discoloration of the beef beneath the label.

21 Claims, 1 Drawing Sheet

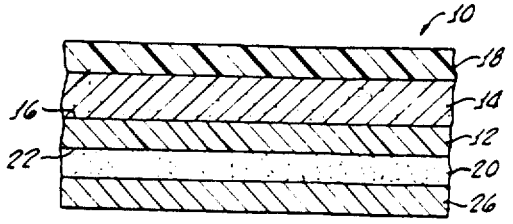
FIG. 1.
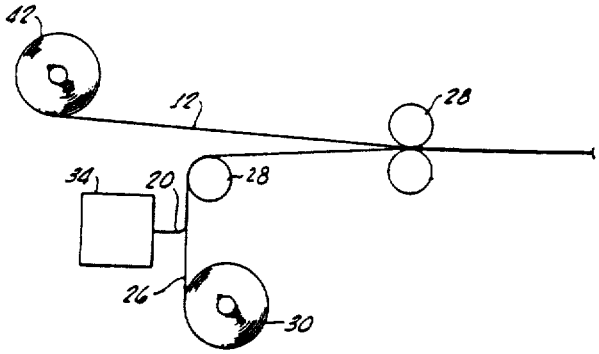
FIG. 2.
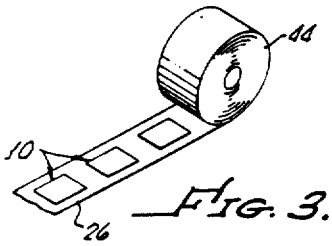
FIG. 3.
FIG. 4.
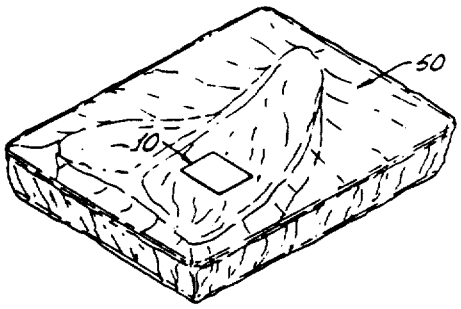

THERMOSENSITIVE RECORDING LABEL

Matter enclosed in heavy brackets [ ] appears in the original patent but forms no part of this reissue specification; matter printed in italics indicates the additions made by reissue.

The present invention relates generally to thermosensitive recording labels and more particularly relates to thermosensitive recording labels suitable for use on polyvinylchloride and polyethylene stretch wrapping films.

Thermosensitive recording labels such as described in U.S. Pat. No. 4,370,370 have been developed to overcome many of the drawbacks of conventional printing with oily or water base inks. Problems associated with conventional printing utilizing oily or water based inks, include the smearing tendency of the ink due to insufficient drying time before utilization of the label, the high maintenance of printing equipment, and the continued replenishment of printing inks, or ribbons if ink impregnated ribbon is used in the printing process. In addition, it is well known that conventional printing with wet ink can be a very messy operation.

Hence, thermosensitive recording labels have been developed which utilize a thermosensitive coloring material comprising a colorless or light-colored leuco dye and acidic substance capable of causing the leuco dye to undergo color formation upon heating of the thermosensitive recording label.

As is well known in the art, a layer of thermosensitive coloring material is disposed on a substrate and a thermal head printer is thereafter used to contact and heat specific areas of the layer to cause color-formation in the areas heated, while the remainder of the layer stays colorless, or light-colored, thereby producing visible alphanumeric characters in the layer.

While these labels may be used on many products without fading of the color formations over long periods of time, it is also well known that when such labels are placed on plastic wrapped products, contact with the plastic wrap from co-mingled products or packages is inevitable. When this occurs, degradation of the heat-formed printing begins as evidenced by fading of the color formed by the leuco dye and the acidic substance.

It is believed that this degradation occurs because migration of the plasticizers used in the plastic wrap occurs. The migration of the plasticizer into the thermosensitive color-forming layer and subsequent reaction therein is believed to cause the fading phenomenon.

As disclosed in U.S. Pat. No. 4,370,370, an attempt to produce a non-fading thermosensitive recording label has included the addition of protective, or barrier, layers on both sides of the thermosensitive color forming layer in order to prevent such migration.

Specifically, after the color-forming layer is applied to a substrate, a barrier layer comprising a water soluble polymeric material is placed over the thermosensitive color forming area, and a second barrier comprising a water soluble polymeric material is placed on the other side of the substrate.

The barrier layer on the substrate is provided to prevent migration of plasticizers from the plastic film on which the label is placed from migrating through the substrate and into the color-forming layer, and the barrier layer placed on the thermosensitive color-forming layer is intended to prevent migration of plasticizers from co-mingled plastic wrapped goods which may come in contact with the label, for migrating thereinto.

While this combination of layers is satisfactory for use as a thermosensitive recording label in many applications, manufacture of the label is made more costly and additional steps must be taken in the production of the label in order to incorporate the barrier label on the substrate.

In addition, it has been found that when such label is placed on plastic stretch wrap film containing beef products, that a dark discoloring of the beef products occurs beneath the label a few hours after application of the label to the packaged beef.

While it is not believed that any deterioration or spoilage of the beef products occurs because of this darkened area, it nonetheless is unattractive to the consumer after removal of the plastic wrap and renders the beef product unacceptable for use by the consumer.

It is not known at the present time exactly why this discoloration occurs only on beef products, but it is suspected to be related to the lack of oxygen penetration beneath the label.

Prior art sensitive recording labels have typically used an acrylic adhesive agent, a styrene-butadiene rubber (SBR) latex adhesive agent, a vinyl acetate adhesive agent or a rubber adhesive agent for securing the label, via the substrate, to goods.

While these adhesives are satisfactory for use on warm, relatively dry goods, they are not suitable as adhesives in holding the thermosensitive recording label to moist, damp, refrigerated or frozen plastic wrap goods such as packaged meats and vegetables or the like.

The present invention overcomes many of the disadvantages of the hereinbefore produced thermosensitive recording labels. It has been found that the use of a hot melt adhesive layer applied to a thermosensitive recording label substrate enables a label, in accordance with the present invention, to be applied to moist and refrigerated goods with sufficient adhesion thereto to ensure contact between the label and the goods even though they may rub up against and come in contact with associated goods during handling of the product.

Further, a label, in accordance with the present invention, utilizing a hot melt type adhesive layer enables the production of a thermosensitive recording label without a barrier layer protecting the substrate. This reduces both the cost of the label and the complexity of manufacture because less steps are required. It appears that the hot melt adhesive prevents migration of the plasticizers from plastic film and the like, onto which the label is placed, from migrating through the hot melt adhesive and into the thermosensitive color forming layer.

In addition, and importantly, it has been discovered that the use of a hot melt adhesive layer, in combination with the substrate and thermosensitive color forming layer, results in a thermosensitive recording label that can be used on refrigerated beef products without discoloration of the beef beneath the labels as occurs with hereinbefore manufactured thermosensitive recording labels.

SUMMARY OF THE INVENTION

A thermosensitive recording label, in accordance with the present invention, includes a substrate, a thermosensitive color-forming layer disposed on one side of the substrate, a protective layer disposed on the thermosensitive color-forming layer, a pressure-sensitive hot melt adhesive layer disposed on another side of said substrate, and a releasable backing sheet disposed on said pressure-sensitive adhesive layer.

The thermosensitive color-forming layer comprises a colorless, or light colored leuco dye and an acidic substance capable of causing the leuco dye to undergo color formation upon heating of the thermosensitive recording label.

More particularly, the thermosensitive recording label according to the present invention includes a pressure-sensitive hot melt adhesive layer comprising at least one adhesive agent selected from the group consisting of thermoplastic styrene-butadiene rubber hot melt adhesive, and acrylic hot melt adhesive.

In a preferred embodiment of the present invention, the thermosensitive recording label includes a pressure-sensitive hot melt adhesive layer having a transition glass temperature of at most about 50° C.

The adhesive agent selected enables the use of the thermosensitive recording label on refrigerated beef products wrapped with a plastic stretch film wrap selected from the group consisting of polyvinylchloride, polyethylene and polyolefin without subsequent discoloration of the beef beneath the thermosensitive recording label. The pressure-sensitive hot melt adhesive layer on the present thermosensitive recording label invention has a thickness from about 15 μm (0.6 mil) to about 23 μm (0.9 mil).

BRIEF DESCRIPTION OF THE DRAWINGS

A better understanding of the present invention may be had from the consideration of the following detailed description, taken in conjunction with the accompanying drawings in which:

FIG. 1 is a cross-sectional view of the thermosensitive recording label in accordance with the present invention generally showing each of the layers included in the label;

FIG. 2 is a diagram showing the production of a thermosensitive recording label in accordance with the present invention showing specifically the application of hot melt adhesives to a backing sheet and subsequent combination of the backing sheet with the remainder of the label with chilled rollers;

FIG. 3 is a perspective view of a roll of thermosensitive recording labels according to the present invention; and, FIG. 4 is a perspective drawing of the thermosensitive recording label in accordance with the present invention as applied to a plastic wrapped refrigerated product.

DETAILED DESCRIPTION OF THE DRAWINGS

Turning now to FIG. 1, the thermosensitive recording label 10 in accordance with the present invention includes a substrate 12, a thermosensitive color-forming layer 14 disposed on one side 16 of the substrate 12, a protective layer 18 disposed on the thermosensitive color-forming layer 14, a pressure-sensitive hot melt adhesive layer 20 disposed on another side 22 of the substrate 12 and a releasable backing sheet 26 disposed on the pressure-sensitive adhesive layer 20.

In general, the substrate 12 may be a high quality paper and the thermosensitive recording color-forming layer 14 is typical of that known in the art as shown in U.S. Pat. Nos. 4,370,370 and 4,388,362, and examples of the colorless or light colored leuco dye and the acidic substances are given therein.

Additionally, as pointed out in U.S. Pat. No. 4,388,362 enhancers may be included in the thermosensitive color-forming layer in order to enhance the distinctiveness of the color images. Such enhancers may include fine powders of calcium carbonate, magnesium carbonate, alumina, silica, talc, barium sulfate, aluminum sterate, styrene resin, urea-formalin resin, or the like. Binder agents also may be utilized in thermosensitive color-forming layers as is well known in the art.

A water soluble resin solution coated on the thermosensitive color-forming layer 14 and thereafter dried forms the protective layer 18. A number of water soluble resins may be utilized in the thickness of the protective layer 18 control as is well known in the art, to prevent subsequent deterioration of the thermosensitive color-forming layer by plasticizers contained in plastic sheet which may be placed on, or in contact with the thermosensitive recording label 10.

Also, in accordance with the prior art, the function of the protective, or barrier label, may be enhanced by adding water-resisting property improvement agents such as formaldehyde, glyoxal, chromium alum, melamine, melamine-formaldehyde resin, polyamide resin.

As generally shown in FIG. 2, the pressure-sensitive hot melt adhesive layer 20, such as thermoplastic rubber copolymer or acrylic thermoplastic hot melt adhesive is disposed on the substrate 26 by heating the hot melt adhesive to a temperature of about 350° F. (177° C.) and thereafter forming a film on the substrate.

It should be appreciated that the hot melt rubber adhesives utilized in the present invention may be classified as thermoplastic rubber block copolymers having, for example, connected blocks of styrene and butadiene which are solid at room temperature but liquid when heated above about 50 to about 100 degrees centigrade.

Thereafter, the substrate 26 with the hot melt adhesive thereon is contacted with the other side 22 of the substrate 12 by passing the backing sheet 26 along with the substrate 12 through a set 28 of chilled rollers thereby disposing the hot melt adhesive 20 onto the substrate 12 without significant heating of the thermosensitive color-forming layer 14.

This is diagramatically shown in FIG. 2 where a roll 30 of backing sheet 26 material which may be high quality paper or densified silicone coated craft paper coated with a film of molten hot melt adhesive 20 by an extruder 34 in a conventional manner and thereafter passed through the chilled rollers 28 along with the substrate 12 already coated with the thermosensitive color-forming layer 14 and barrier 18, pulled from a roll 42.

The resulting labels may be formed into a roll 44 (see FIG. 3) for ease in subsequent use.

It should also be appreciated that the releasable backing sheet 26 may be silicone coated and/or the substrate surface 22 treated in a manner such that the pressure-sensitive hot melt adhesive layer 20 remains on the substrate surface 22 when the releasable backing sheet 26 is removed or peeled therefrom to enable the thermosensitive recording label 10 to be fixed to goods 50 (see FIG. 4).

The pressure-sensitive hot melt adhesives that may be used with the present invention are cold and freezer graded commercially available adhesive products.

The following example is presented by way of illustration only, and is not to be considered limiting to the present invention.

EXAMPLE 1

A solution of leuco dye and acid substance was prepared as follows:

| | Parts by Weight |
|---|---|
| Dispersant A | |
| 3-diethyl-C-methyl-7-anilino fluoran | 1.5 |
| Polyvinyl alcohol (20% aqueous solution) | 5.0 |
| Water | 43.5 |
| Dispersant B | |
| Bisphenol A | 6.0 |
| Stearic acid amide | 1.0 |
| Polyvinyl alcohol (20% aqueous solution) | 10.0 |
| Water | 33.0 |

The prepared Dispersant A and Dispersant B were mixed to form a thermosensitive coloring liquid which was applied to a substrate consisting of high quality paper and weighing about 58 gr./m$^2$, and thereafter dried at room temperature up to 120° C. to form a thermosensitive color-forming layer in which the solids therein amounted to about 4.0 to about 10 gr./m$^2$. Thereafter, a water soluble resin solution comprising 5 parts of polyvinyl alcohol in 95 parts of water was applied to the heat sensitive color-forming layer and dried at about 25° to 120° C. to thereby form a protective layer over the thermosensitive color-forming layer, said protective layer having a quantity of solids of about 2 gr./m$^2$.

A backing sheet consisting of high quality paper and weighing about 70 grs./m$^2$ was silicone treated by either solvent-base or 100% solid release paper coating and thereafter cold or freezer type hot melt adhesive was heated to 350° F. (177° C.) and applied to the substrate, such application amounting to a layer having a quantity of solids of about 23 gr./m$^2$. Thereafter, the backing sheet with the hot melt adhesive applied thereto was passed through chilled rollers to contact the substrate material and form a roll of thermosensitive recording labels.

Subsequently, a label prepared in accordance with this example was applied to a beef filet mignon wrapped with polyethylene or polyolefin stretch plastic film, which had been refrigerated. The label adhered to and was not easily removed from the plastic film and after 24 hours at a refrigerated temperature of about 37° F. (2° C.), the plastic film, along with the thermosensitive label, was removed from the filet mignon. On subsequent examination, the filet mignon showed no discoloration under the label disposed on the plastic wrap over the filet mignon.

By comparison, a label made in accordance with U.S. Pat. No. 4,370,370 did not adhere well to the refrigerated plastic film material covering the filet mignon. In addition, it was observed that after a lapse of approximately 4 hours, a discoloration of the filet mignon was observed underneath the prior art label.

EXAMPLE 2

A label prepared as in Example 1 was applied to a beef sirloin steak wrapped with polyethylene or polyolefin stretch plastic film which had been refrigerated. The label adhered to and was not easily removed from the plastic sheet and after 24 hours at a refrigerated temperature of about 37° F. (2° C.), the plastic film, along with the thermosensitive label, was removed from the sirloin steak. On subsequent examination, the sirloin steak showed no discoloration under the label disposed on the plastic film over the sirloin steak.

By comparison, a label made in accordance with U.S. Pat. No. 4,370,370 did not adhere well to the refrigerated plastic sheet material covering the sirloin steak. In addition, it was observed that after a lapse of approximately 6 to 8 hours a discoloration of the sirloin steak was observed underneath the prior art label.

EXAMPLE 3

A label prepared as in Example 1 was applied to a New York steak wrapped with polyethylene or polyolefin stretch plastic film which had been refrigerated. The label adhered to and was not easily removed from the plastic sheet and after 24 hours at a refrigerated temperature of about 37° F. (2° C.), the plastic sheet, along with the thermosensitive label, was removed from the New York steak. On subsequent examination, the New York steak showed no discoloration under the label disposed on the plastic film over the New York steak.

By comparison, a label made in accordance with U.S. Pat. No. 4,370,370 did not adhere well to the refrigerated plastic film material covering the New York steak. In addition, it was observed that after a lapse of approximately 6 to 8 hours a discoloration of the New York steak was observed underneath the prior art label.

Although there has been described hereinabove a specific thermosensitive recording label in accordance with the present invention for the purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A thermosensitive recording label comprising:

a substrate;

a thermosensitive color-forming layer disposed on one side of said substrate, said thermosensitive color-forming layer comprising a colorless or light-colored leuco dye and acidic substance capable of causing said leuco dye to undergo color formation upon heating of the thermosensitive recording label;

a protective layer disposed on said thermosensitive color-forming layer;

a pressure-sensitive hot melt adhesive layer disposed on another side of said substrate said pressure-sensitive hot melt adhesive layer comprising at least one adhesive agent selected from the group consisting of a styrene-butadiene rubber hot melt adhesive and an acrylic hot melt adhesive, and, a releasable backing sheet disposed on said pressure-sensitive adhesive layer.

2. The thermosensitive recording label according to claim 1 wherein the pressure-sensitive hot melt adhesive layer has a transition glass temperature of at most about 50° C.

3. The thermosensitive recording label according to claim 2 wherein the pressure-sensitive hot melt adhesive layer comprises one of the groups of thermoplastic rubber adhesive and thermoplastic acrylic adhesive.

4. The thermosensitive recording label according to claim 3 wherein the pressure-sensitive hot melt adhesive layer has a thickness from about 15 μm (0.6 mil) to about 23 μm (0.9 mil).

5. The thermosensitive recording label according to claim 1 wherein the adhesive agent selected enables the use of the thermosensitive recording label on refrigerated beef products wrapped with plastic wrapping film without subsequent discoloration of the beef beneath the thermosensitive recording label.

6. The thermosensitive recording label according to claim 1 wherein the adhesive agent selected enables the use of the thermosensitive recording label on refrigerated beef products wrapped with a plastic stretch film wrap selected from the group consisting of polyvinylchloride, polyethylene and polyolefin without subsequent discoloration of the beef beneath the thermosensitive recording label.

7. The thermosensitive recording label according to claims 5 or 6 wherein the pressure-sensitive hot melt adhesive layer has a transition glass temperature of at most about 50° C.

8. The thermosensitive recording label according to claim 7 wherein the pressure-sensitive hot melt adhesive layer has a thickness sufficient to prevent migration of plasticizers within the plastic wrapping film from migrating to the thermosensitive color-forming layer when the thermosensitive recording label is disposed on said plastic wrapping film.

9. The thermosensitive recording label according to claim 7 wherein the pressure-sensitive hot melt adhesive layer has a thickness from about 15 μm (0.6 mil) to about 23 μm (0.9 mil).

10. A thermosensitive recording label comprising:

a substrate;

a thermosensitive color-forming layer disposed on one side of said substrate, said thermosensitive color-forming layer comprising a colorless or light-colored leuco dye and an acidic substance capable of causing said leuco dye to undergo color formation upon heating of the thermosensitive recording label;

a second protective layer disposed on another side of said substrate;

a pressure-sensitive hot melt adhesive layer disposed on said second protective layer, said pressure-sensitive hot melt adhesive layer comprising at least one adhesive agent selected from the group consisting of a styrene-butadiene rubber hot melt adhesive and an acrylic hot melt adhesive, said selected adhesive agent enabling the use of the thermosensitive recording label on refrigerated products wrapped with a stretch wrapping film selected from the group consisting of polyvinylchloride, polyethylene and polyolefin and polyethylene; and, a releasable backing sheet disposed on said pressure-sensitive adhesive layer.

11. The thermosensitive recording label according to claim 10 wherein the pressure-sensitive hot melt adhesive layer has a transition glass temperature of at most about 50° C.

12. The thermosensitive recording label according to claim 11 wherein the pressure-sensitive hot melt adhesive layer has a thickness from about 15 μm (0.6 mil) to about 23 μm (0.9 mil).

*13. A thermosensitive recording label comprising:*

*a substrate;*

*a thermosensitive color-forming layer disposed on one side of said substrate, said thermosensitive color-forming layer comprising a colorless or light-colored leuco dye and acidic substance capable of causing said leuco dye to undergo color formation upon heating of the thermosensitive recording label;*

*a pressure-sensitive hot melt adhesive layer disposed on another side of said substrate, said pressure-sensitive hot melt adhesive layer comprising at least one adhesive agent selected from the group consisting of a styrene-butadiene rubber hot melt adhesive and an acrylic hot melt adhesive, and,*

*a releasable backing sheet disposed on said pressure-sensitive adhesive layer.*

*14. The thermosensitive recording label according to claim 13 wherein the pressure-sensitive hot melt adhesive layer has a transition glass temperature of at most about 50° C.*

*15. The thermosensitive recording label according to claim 14 wherein the pressure-sensitive hot melt adhesive layer comprises one of the groups of thermoplastic rubber adhesive and thermoplastic acrylic adhesive.*

*16. The thermosensitive recording label according to claim 15 wherein the pressure-sensitive hot melt adhesive layer has a thickness from about 15 microns (0.6 mil) to about 23 microns (0.9 mil).*

*17. The thermosensitive recording label according to claim 13 wherein the adhesive agent selected enables the use of the thermosensitive recording label on refrigerated beef products wrapped with plastic wrapping film without subsequent discoloration of the beef beneath the thermosensitive recording label.*

*18. The thermosensitive recording label according to claim 13 wherein the adhesive agent selected enables the use of the thermosensitive recording label on refrigerated beef products wrapped with a plastic stretch film wrap selected from the group consisting of polyvinylchloride, polyethylene and polyolefin without subsequent discoloration of the beef beneath the thermosensitive recording label.*

*19. The thermosensitive recording label according to claims 17 or 18 wherein the pressure-sensitive hot melt adhesive layer has a transition glass temperature of at most about 50° C.*

*20. The thermosensitive recording label according to claim 19 wherein the pressure-sensitive hot melt adhesive layer has a thickness sufficient to prevent migration of plasticizers within the plastic wrapping film from migrating to the thermosensitive color-forming layer when the thermosensitive recording label is disposed on said plastic wrapping film.*

*21. The thermosensitive recording label according to claim 19 wherein the pressure-sensitive hot melt adhesive layer has a thickness from about 15 microns (0.6 mil) to about 23 microns (0.9 mil).*

* * * * *